United States Patent
Fifield

(10) Patent No.: US 9,540,711 B2
(45) Date of Patent: Jan. 10, 2017

(54) HARDBANDING ALLOY

(75) Inventor: Robin William Sinclair Fifield, Queensland (AU)

(73) Assignee: Robin William Sinclair Fifield, Queensland (AU)

( * ) Notice: Subject to any disclaimer, the term of this patent is extended or adjusted under 35 U.S.C. 154(b) by 1167 days.

(21) Appl. No.: 13/360,352

(22) Filed: Jan. 27, 2012

(65) Prior Publication Data

US 2012/0196149 A1 Aug. 2, 2012

Related U.S. Application Data

(60) Provisional application No. 61/443,784, filed on Feb. 17, 2011.

(30) Foreign Application Priority Data

Jan. 31, 2011 (SG) .................................. 201100730

(51) Int. Cl.

| | | |
|---|---|---|
| B23K 35/30 | (2006.01) | |
| B23K 35/02 | (2006.01) | |
| C22C 29/02 | (2006.01) | |
| C22C 38/46 | (2006.01) | |
| C22C 1/02 | (2006.01) | |
| B23K 9/00 | (2006.01) | |

(52) U.S. Cl.
CPC ............. *C22C 1/02* (2013.01); *B23K 35/3086* (2013.01); *B23K 9/00* (2013.01); *B23K 35/0261* (2013.01); *C22C 29/02* (2013.01); *C22C 38/46* (2013.01); *Y10T 428/12972* (2015.01)

(58) Field of Classification Search
CPC .......... C22C 38/02; C22C 38/04; C22C 38/08; C22C 38/12; C22C 38/14; C22C 38/18; C22C 38/22; C22C 38/24; C22C 38/28; C22C 38/36; C22C 38/40; C22C 38/44; C22C 38/46; C22C 38/50; C22C 38/56; C22C 9/02; C22C 9/06; C22C 9/067; C22C 9/10; C22C 29/0047
See application file for complete search history.

(56) References Cited

U.S. PATENT DOCUMENTS

| | | | | |
|---|---|---|---|---|
| 3,231,709 A | * | 1/1966 | Foley, Jr. ............. | B23K 35/308 219/146.51 |
| 3,334,975 A | * | 8/1967 | Quaas ................... | B23K 35/327 219/145.22 |
| 6,331,688 B1 | * | 12/2001 | Hallen ............... | B23K 35/0255 219/136 |
| 6,375,895 B1 | | 4/2002 | Daemen | |
| 7,361,411 B2 | | 4/2008 | Daemen et al. | |
| 7,569,286 B2 | | 8/2009 | Daemen et al. | |
| 8,444,743 B2 | * | 5/2013 | Spitzer .................. | C21C 5/5264 75/10.16 |
| 2007/0187369 A1 | * | 8/2007 | Menon et al. ............... | 219/76.1 |
| 2008/0253919 A1 | * | 10/2008 | Theisen .............. | C22C 33/0285 420/12 |
| 2009/0019783 A1 | * | 1/2009 | Amano .................... | B23K 9/04 51/309 |
| 2009/0261085 A1 | * | 10/2009 | Suzuki ................... | B23K 9/173 219/137 PS |
| 2010/0101780 A1 | * | 4/2010 | Ballew et al. ............. | 166/242.6 |

FOREIGN PATENT DOCUMENTS

| | | | | | |
|---|---|---|---|---|---|
| DE | 2754437 | | * | 7/1979 | |
| JP | 55024979 | A | * | 2/1980 | |
| JP | 60012296 | A | * | 1/1985 | |
| WO | WO2008/084108 | A1 | * | 7/2008 | ............. C22C 38/06 |
| WO | WO 2009076923 | A2 | * | 6/2009 | ........... C21C 5/5264 |

OTHER PUBLICATIONS

Annette O'Brien, editor, Welding Handbook, Ninth Ed., vol. 2, Welding Processes, Part 1, pp. 230-254 ("Welding Handbook").*
"Glossary of Metallurgical and Metalworking Terms," Metals Handbook, ASM International, 2002, term(s): hardfacing alloys.*
"Glossary of Metallurgical and Metalworking Terms," Metals Handbook, ASM International, 2002, term(s): electrode(welding), hardfacing, hardfacing alloys, welding rod, welding wire.*
Annette O'Brien, editor, Welding Handbook, Ninth ed., vol. 2, Welding Processes, Part 1, 2004, pp. 230-254.*

* cited by examiner

*Primary Examiner* — Scott Kastler
*Assistant Examiner* — Vanessa Luk
(74) *Attorney, Agent, or Firm* — Birch, Stewart, Kolasch & Birch, LLP

(57) ABSTRACT

The present disclosure relates to an alloy, for hardbanding and/or hard overlay applications, which is abrasion resistant to the order of siliceous earth particles and weldable in crack free state on industrial products. The alloy is a carbon chrome based alloy comprising titanium and vanadium carbides and thus has an extremely low coefficient of friction, high abrasion resistance as welded without working. In tool joints and stabilizers, the alloy achieves an optimum balance between tool joint and stabilizer wear resistance and induced casing wear. The alloy is also self-shielded and therefore does not require external shielding gas.

16 Claims, No Drawings

HARDBANDING ALLOY

CROSS REFERENCE TO RELATED APPLICATIONS

This nonprovisional application claims the benefit under 35 U.S.C. §119(e) of U.S. Provisional Application No. 61/443,784 filed on Feb. 17, 2011 and under 35 U.S.C. §119(a) of Patent Application No. 201100730-9 filed in Singapore on Jan. 31, 2011. The entire content of all of the above applications is hereby incorporated by reference.

FIELD OF THE INVENTION

The present invention relates generally to materials for use in hardbanding or hardfacing a base metal, and in particular, to an alloy for use in hardbanding or hardfacing industrial products such as, but not limited to, products used in the oil and gas drilling industry.

BACKGROUND OF THE INVENTION

Hardbanding or hardfacing refers to a process whereby a harder or more wear resistant material is applied to a surface of a base material to make the base material more resistant to wear and the like. In this regard, hardbanding may be applied to new parts or products to increase the wear resistance of that part, or to used or older parts or products in order to restore a worn surface of the part and to extend the working life of the part or product.

Hardbanding is used across a variety of industries and applications where mechanical parts or components are employed. In industries such as the oil and gas drilling industry, tool joints and stabilizers used in earth boring equipment are prone to experience a high degree of surface wear due to the particularly abrasive environments in which they are used. As such, the service life and the performance of the components can be significantly reduced, and this can have a detrimental effect on both industry productivity and worker safety.

Traditionally, titanium carbide alloys have been used for hardbanding industrial products such as, but not limited to, tool joints and stabilizers in oil and gas well drilling industry. However, as the industry currently experiences severe problems with service life of these tool joints and stabilizers as well as high casing wear, there is a demand for improved hardbanding materials.

Developing new materials are also fraught with difficulties as mixing complex carbides is problematic from a field service point of view. Further, any new material has to exhibit sufficiently desirable characteristics including, but not limited to, abrasion resistance, hardness, crack resistance.

Thus, there is a need to provide an improved hardbanding alloy composition having increased wear resistance properties and which can be efficiently applied to a variety of components to increase the operating life and performance of such components.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

According to a first aspect, there is provided a hardbanding alloy for application as a weld deposit to a surface, the alloy comprising by weight about 2% to about 4% vanadium; and about 3% to about 6% titanium.

In one embodiment, the hardbanding alloy further comprises by weight about 1.2% to about 1.9% carbon; about 3% to about 7% chromium, and the balance iron, including impurities as trace elements. In another embodiment, the hardbanding alloy still further comprising by weight any one or more of about 1% to about 1.5% manganese; about 0.5% to about 1.3% molybdenum; about 0.5% to about 1.5% silicon and about 0.5% to about 1% nickel.

When the hardbanding alloy is applied as a weld deposit, the weld deposit may form a matrix having titanium carbides and vanadium carbides suspended therein. The titanium carbides and the vanadium carbides may be substantially uniformly dispersed within the matrix.

The hardbanding alloy may be formed as a metal-cored wire. The metal cored wire may be a self shielded metal cored wire.

The hardbanding alloy may have a deposited hardness of from about 57 HRC to about 61 HRC. In one form, the hardbanding alloy may be deposited as a single deposit overlay. In another form, the hardbanding alloy may be deposited as two or more juxtaposed layers According to a second aspect, there is provided a method of prolonging the life of an industrial product subject to abrasion during use, comprising welding the hardbanding alloy of the first aspect of the invention to one or more surfaces of the industrial product subject to abrasion during use.

In an embodiment of the second aspect of the invention, the hardbanding alloy is contained in a self shielded metal cored wire.

According to a third aspect of the present invention, there is provided a material for hardbanding a surface of a base material comprising:

a carbon chrome based alloy having vanadium carbide granules and titanium carbide granules.

In an embodiment of the third aspect of the invention, the material is formed as a metal-cored wire. The metal cored wire may be self shielded. The material may be applied to the surface of the base material by welding. The base material may be an industrial product. The industrial product may be a tool or stabilizer used in earth boring equipment.

In another embodiment of the third aspect of the invention, the alloy comprises, by weight, about 2% to about 4% vanadium; and about 3% to about 6% titanium. The alloy may further comprise, by weight, about 1.2% to about 1.9% carbon; about 3% to about 7% chromium, and the balance iron, including impurities as trace elements.

DETAILED DESCRIPTION OF AN EMBODIMENT OF THE INVENTION

The invention will be described below in relation to its application to industrial products in the oil and gas drilling industry. However, it will be appreciated that the present invention could be employed across a variety of industrial applications where hardbanding processes are commonly employed.

The present invention comprises an alloy composition which may be used in hardbanding and/or hard overlay applications. The alloy composition combines titanium carbide and vanadium carbide, and utilises the extremely dense, low porous and smooth properties of vanadium to create a dense structure of complex titanium carbides and vanadium carbides having enhanced interfacial strength between matrix and the complex carbides.

According to a preferred embodiment of the present invention, the hardbanding alloy composition comprises, by weight, about 1.2 percent (%) to about 1.9% carbon (C), about 3% to about 7% chromium (Cr), about 2% to about 4% vanadium (V), about 3% to about 6% titanium (Ti), with the balance comprising iron (Fe—O iron) and impurities as trace elements.

In some situations, the alloy composition may further comprise any one or more of about 1% to about 1.5% manganese (Mn), about 0.5% to about 1.3% molybdenum (Mo), about 0.5% to about 1.5% silicon (Si) and about 0.5% to about 1% nickel (Ni). In an embodiment, more than about 22% by weight of the alloy is comprised of chromium, molybdenum, vanadium, titanium, manganese, silicon and nickel.

A chemical analysis of a preferred alloy composition is set forth in the following table.

| | |
|---|---|
| Carbon (C) | 1.6% |
| Chromium (Cr) | 5.0% |
| Titanium (Ti) | 4% |
| Vanadium (V) | 2.4% |
| Manganese (Mn) | 1.2% |
| Molybdenum (Mo) | 0.8% |
| Remainder Iron (Fe) including trace elements as contaminants | |

To facilitate application of the alloy to a tool or component, the alloy is formed as a flux cored, self shielded, open arc welding wire, hereinafter referred to as a Self-shielded Metal-cored wire (SSMCW). The microstructure of the alloy composition is created using a suitable inoculation technique for the insertion of vanadium. When deposited, the granules of titanium carbide and vanadium carbide are uniformly dispersed within the alloy matrix thus forming a dense structure of complex titanium and vanadium carbides with enhanced interfacial strength between matrix and complex carbides.

As a result of this microstructure and composition, the matrix of the alloy possesses an exceptionally high abrasion resistance. This has been specified in tests to ASTM G65 (Practice B) of 3.2 to 3.3 metal volume loss cubic millimeters. The alloy matrix has an exceptionally low coefficient of friction, due in part to the presence of the vanadium carbide, which increases the wear resistance of the alloy whilst minimising casing wear. Casing wear is minimised due to the enhanced interfacial strength between the matrix and the carbides, such that premature removal of abrasive carbide particles into the casing is avoided, thus avoiding the potential for further casing damage.

The microstructure of the deposited alloy composition also provides for increased crack resistance. The inherent properties of the alloy microstructure is designed to avoid relief cracks and cracks visible to the naked eye upon application of the alloy to a component. The uniform dispersion of complex titanium and vanadium carbides within the structure of the alloy composition further enhances the toughness of the alloy. In this regard, the alloy has been found to exhibit a hardness of about 57 HRC to about 61 HRC on a single deposit overlay.

The alloy, according to embodiments of the invention, may be applied to components as a single layer overlaying an industrial product or as two or more juxtaposed layers. In a single layer, the alloy thickness may be about 3/32 inch+ 1/32–0. The SSMCW of alloy is preferably produced with a suitable micro-flux system designed to provide a complete shield to the welding arc with deposit efficiencies of at least about 98.4%. By providing such higher deposition efficiencies, higher production rates are achievable. Further, with complete shielding, the SSMCW produces virtually no flux residue and therefore does not require any external shielding gas. As such, the welding process is simple since the alloy is designed to be applied using field service Hardbanding machines or fully automatic closed machines utilised in OEM (Original Equipment Manufacturer) applications.

It will be appreciated that the alloy composition of the present invention provides a number of significant advantages over pre-existing hardbanding alloys. These include, but are not limited to:

Very low splatter, smooth bead profile and virtually no slag residue.

Better welder and applicator appeal and wider window of operating parameters.

Extremely high stress abrasion resistant to siliceous earth particles

Crack resistant and crack free as detected by the naked eye after application of the alloy.

Weld metal will not spall. Weldable in crack free state on industrial products

Impact resistant.

Casing friendly overlay alloy.

Can be reapplied over itself.

As previously discussed, the alloy has specific application to tool joints having the hardbanding alloy welded to the outer cylindrical surface to its box and pin members and to stabilizer ribs on the stabilizer used in earth boring, such as boring for oil and gas. While the alloy is suited for hardbanding tool joints and stabilizers, it may be applied to any surface requiring hardbanding or hardfacing, such as structural members, process components, abrasion resistant plates, and the like. The alloy may alternatively be used as a hard overlay material.

It will be appreciated that the complex titanium/vanadium carbide hardbanding alloy of the present invention has a unique microstructure and composition that enhances service life of tool joints as well as improves performance of components across a wide variety of industries, including the oil and gas drilling industry. Such an improvement in abrasive wear resistance is achieved together with a significant reduction in casing wear, thus representing a significant inhibition of loss of abrasive carbide particles from the deposited alloy, a condition which is a significant problem with other titanium carbide alloys. Thus, the present invention provides an alloy, for hardbanding and/or hard overlay applications, which is abrasion resistant to the order of siliceous earth particles and weldable in crack free state on industrial products. The alloy has an extremely low coefficient of friction, high abrasion resistance as welded without working. In tool joints and stabilizers, the alloy achieves an optimum balance between tool joint and stabilizer wear resistance and induced casing wear. The alloy is also self-shielded and therefore does not require external shielding gas.

It will be appreciated by those skilled in the art that many modifications and variations may be made to the methods of the invention described herein without departing from the spirit and scope of the invention.

The claims defining the Invention are as follows:

1. A hardbanding alloy, comprising by weight:
   about 2.4% vanadium;
   about 4% titanium;

about 1.2% manganese;
about 0.5% to about 1% nickel;
about 5.0% to about 7% chromium; and
about 0.8% molybdenum,
  wherein the hardbanding alloy is formed as a self-shielded, metal-cored, open arc welding wire, and wherein the hardbanding alloy is to be applied as a weld deposit to a surface to produce a wear resistant overlay on the surface.

2. A hardbanding alloy according to claim 1, further comprising by weight:
  about 1.2% to about 1.9% carbon; and the balance iron, including impurities as trace elements.

3. A hardbanding alloy according to claim 2, further comprising by weight:
  about 0.5% to about 1.5% silicon.

4. A hardbanding alloy according to claim 1, wherein when applied as the weld deposit, the weld deposit forms a matrix having titanium carbides and vanadium carbides suspended therein.

5. A hardbanding alloy according to claim 4, wherein the titanium carbides and the vanadium carbides are substantially uniformly dispersed within the matrix.

6. A hardbanding alloy according to claim 1, wherein the alloy has a deposited hardness of from about 57 HRC to about 61 HRC.

7. A hardbanding alloy according to claim 6, wherein the wear resistant overlay is a single deposit overlay.

8. A hardbanding material comprising:
  a carbon chrome based alloy having vanadium carbide granules and titanium carbide granules;
  wherein the alloy comprises, by weight, about 2.4% vanadium, about 4% titanium, about 1.2% manganese, about 0.5% to about 1% nickel, about 5.0% to about 7% chromium, and about 0.8% molybdenum;
  wherein the alloy is formed as a self-shielded, metal-cored, open arc welding wire, and wherein the alloy is to be applied as a weld deposit to a surface of a base material to produce a wear resistant overlay on the surface of the base material.

9. A hardbanding material according to claim 8, wherein the base material is an industrial product.

10. A hardbanding material according to claim 9, wherein the industrial product is a tool or stabilizer used in earth boring equipment.

11. A hardbanding material according to claim 8, wherein the alloy further comprises, by weight, about 1.2% to about 1.9% carbon; and the balance iron, including impurities as trace elements.

12. A welded component, comprising:
  a surface;
  a wear resistant overlay which is applied to the surface and includes at least one weld deposit, wherein the at least one weld deposit is produced from a hardbanding alloy which is formed as a self-shielded, metal-cored, open arc welding wire, and wherein the at least one weld deposit comprises, by weight:
  about 2.4% vanadium;
  about 4% titanium;
  about 1.2% manganese;
  about 0.5% to about 1% nickel;
  about 5.0% to about 7% chromium; and
  about 0.8% molybdenum.

13. The welded component according to claim 12, wherein the at least one weld deposit forms a matrix having titanium carbides and vanadium carbides suspended therein, and
  wherein the titanium carbides and the vanadium carbides are substantially uniformly dispersed within the matrix.

14. The welded component according to claim 13, wherein the surface is part of a tool joint or stabilizer used in earth boring equipment.

15. A method of prolonging the life of an industrial product subject to abrasion during use, comprising:
  welding the hardbanding alloy of claim 1 to one or more surfaces of the industrial product subject to abrasion during use.

16. A method according to claim 15, wherein the hardbanding alloy is contained in a self shielded metal cored wire.

* * * * *